United States Patent [19]
Spangler

[11] 3,961,820
[45] June 8, 1976

[54] ADJUSTABLE SUN SHIELD

[76] Inventor: Eugene A. Spangler, 5513 Watcher St., Bell Gardens, Calif. 90201

[22] Filed: May 13, 1974

[21] Appl. No.: 469,546

[52] U.S. Cl............................................. 296/97 C
[51] Int. Cl.² ........................................... B60J 3/02
[58] Field of Search ....................... 296/97 C, 97 R

[56] References Cited
UNITED STATES PATENTS

| | | | |
|---|---|---|---|
| 1,421,467 | 7/1922 | Harden | 296/97 C X |
| 2,101,901 | 12/1937 | Fletcher | 296/97 C |
| 2,252,716 | 8/1941 | Levy | 296/97 C |
| 2,818,298 | 12/1957 | Goeske | 296/97 C |
| 3,304,118 | 2/1967 | Jonas | 296/97 C |
| 3,351,375 | 11/1967 | Wheeler | 296/97 C |

*Primary Examiner*—Albert J. Makay
*Assistant Examiner*—Donald W. Underwood
*Attorney, Agent, or Firm*—Lyon and Lyon

[57] ABSTRACT

An adjustable sun shield adapted to be extended from an automobile sun visor to shield a passenger's eyes from the rays of the sun. The screen is comprised of a tinted translucent sheet which has a reinforcing rib extending along the upper edge thereof and a pair of supporting arms which are pivotally secured to the reinforcing rib and adapted to secure the sun screen to the sun visor.

1 Claim, 4 Drawing Figures

ADJUSTABLE SUN SHIELD

BACKGROUND OF THE INVENTION

A common complaint among passengers in automobiles is their inability to adequately shield their eyes from the glaring rays of the sun. This problem is particularly acute, of course, when the vehicle is traveling toward the sun which is positioned fairly low on the horizon. All standard vehicles are equipped with sun visors which are hingedly secured to the vehicle at their outer end so that they can be pivoted into a parallel relation with the side windows of the vehicle to protect the drivers and passengers when the vehicle is traveling perpendicular to the sun's rays. These visors are fairly effective in this orientation. However, when traveling toward a setting sun, the visors can only be pivoted downwardly the amount equal to the width of the visor itself. This does not provide an adequate shield to the sun's rays, particularly with respect to the passenger's eyes as he is generally seated back in a restful position with his head and eyes in a horizontal plane beneath the lower edge of the vehicle's sun visor where his eyes are subjected to the rays of the sun. Because of the sun, the passenger, while attempting to relax is made uncomfortable and must resort to the wearing of tinted glasses or otherwise shield his eyes from the sun. Furthermore, such visors do not give either the driver or passenger any protection from the headlights of oncoming vehicles during night time driving.

SUMMARY OF THE INVENTION

Briefly, the invention comprises a tinted translucent sheet which extends downwardly from the lower edge of the vehicle's sun visor. The sheet is held by a pair of supporting arms which are pivotally secured there to and allow the tinted sheet to move both upwardly and downwardly or to the left or to the right with respect to the vehicle's sun visor. In this manner, the tinted sheet can be continually positioned between the sun and passenger's eyes, shielding the latter from the former.

It is the primary object of this invention to provide an adjustable sun shield which can be positioned to shield a passenger's eyes from the rays of the sun.

It is another object of this invention to provide a sun shield which is highly flexible in mounting orientation and easy to adjust.

It is yet another object of this invention to provide a shield which is adjustably mounted to a driver or passenger's eyes from the headlights of oncoming vehicles.

It is a further object of this invention to provide a sun shield which is of simple construction and economical to manufacture.

It is a further object of this invention to provide a sun shield which is both light in weight and small in bulk so that it may be economically sent through the mail to reach all segments of the population.

These and other objects and advantages of the present invention will become apparent upon the following detailed description taken in conjunction with the accompanying drawings.

IN THE DRAWINGS

Figure 1:
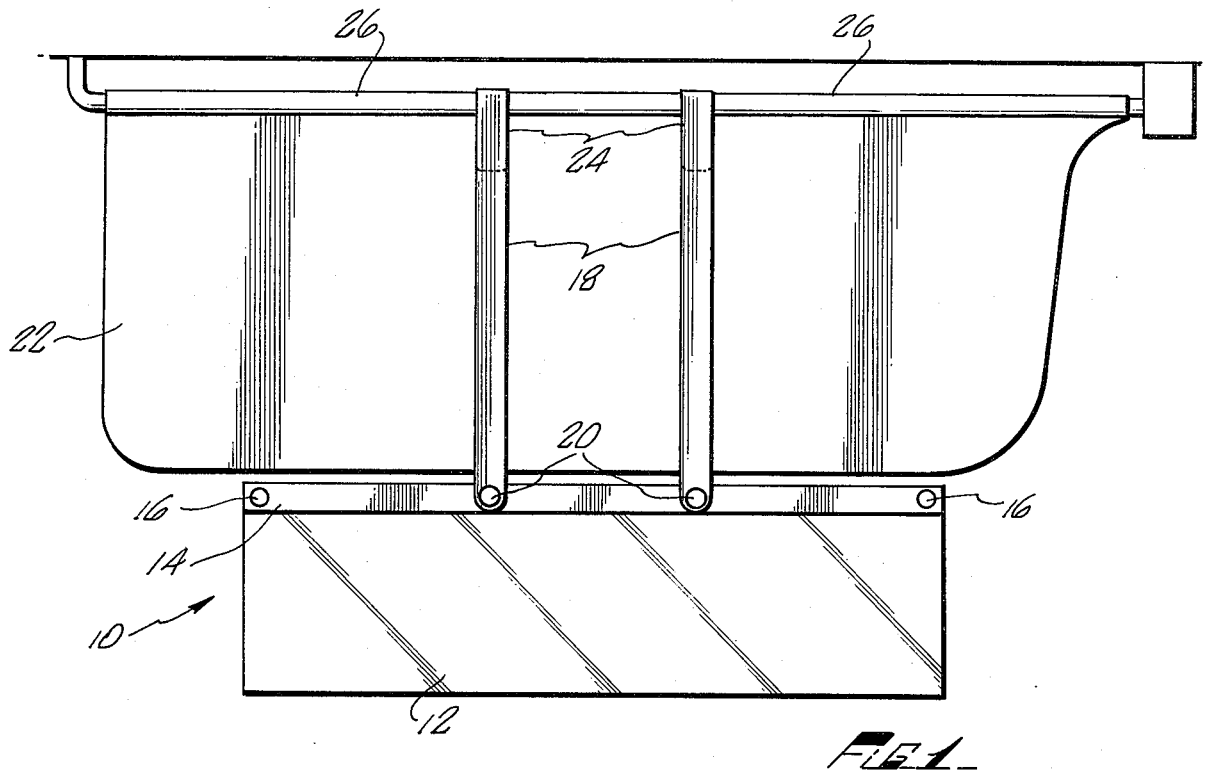
FIG. 1 is a frontal view of the sun screen extended from the car visor.

Referring now in detail to the drawings, the sun screen 10 is seen in FIG. 1 to be comprised of a tinted sheet 12 having a reinforcing rib 14 secured along the upper edge thereof by rivets 16 or other suitable fastening means. The supporting rib 14 can be constructed of a metallic or plastic material to provide a spring action to the tinted sheet due to the elastic recovery in the rib whereby any deviation of the tinted sheet from a flat plane is resisted by the natural bias of the rib. A pair of upstanding support arms 18 are pivotally secured to the tinted sheet 12 and reinforcing rib 14 by fastening means 20. As can be seen in the drawings, the support arms are spaced from each other along the reinforcing rib to provide increased flexibility in the positioning of the tinted sheet with respect to the sun visor 22 as will be described below.

Figure 2:
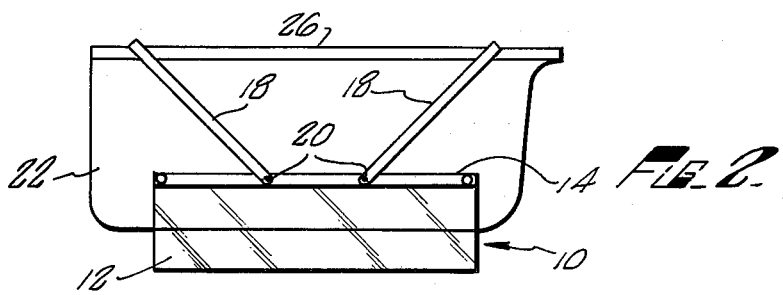
FIG. 2 is a view of the sun screen extending from the car visor in a slightly revised position.
Figure 3:
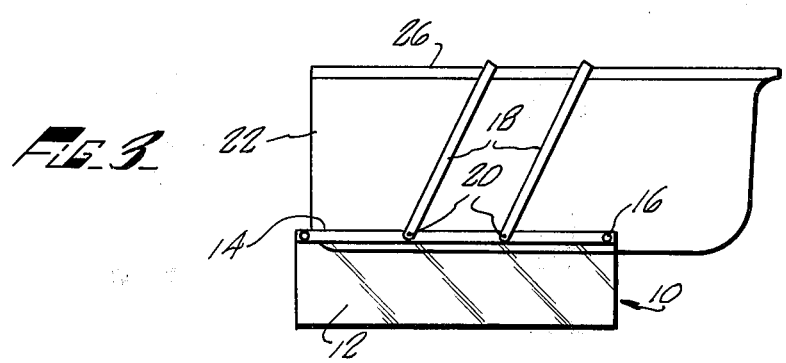
FIG. 3 is a view of the sun screen extending from and pivoted to the left with respect to the car visor.
Figure 4:
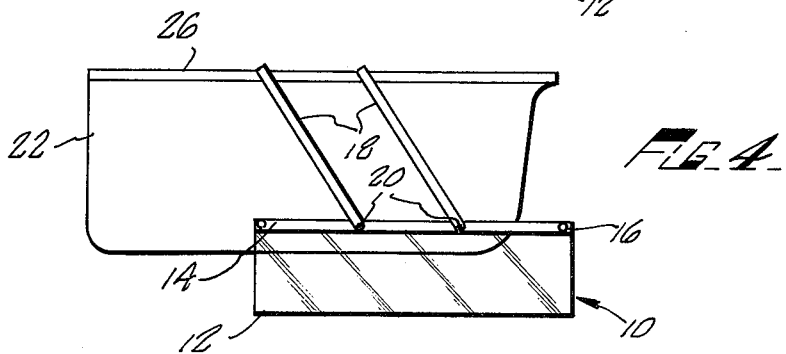
FIG. 4 is a view of the sun screen extending from and pivoted to the right with respect to the car visor.

Each of the supporting arms 18 have their upper ends bent back onto themselves to form support hooks 24 which fit about the upper edge 26 of the visor 22. It can be seen in FIG. 2 that by varying the position of the hooks 24 along the upper edge of the visor, the elevation of the sun screen 10 can be raised and lowered with respect to the visor. In addition, due to the pivotal mounting of the lower ends of the support arms 18, the lateral position of the tinted sheet can also be varied with respect to the visor as seen in FIGS. 3 and 4. Due to this flexibility built into the above-described mounting means, the tinted sheet can be continuously positioned between a passenger's eyes and the glaring rays of the sun. In addition, it can be seen that the sun screen can also shield the driver or passenger's eyes from the headlights of oncoming vehicles during night time driving. For such use, an amber visor has been found to be quite effective. The amber visor is also helpful to the driver when driving through fog.

I claim:

1. An adjustable sun screen adapted to be supported from an automobile sun visor, said sun screen comprising a tinted translucent sheet, a reinforcing rib disposed along the upper edge of said sheet and extending substantially the length thereof, means for securing said rib to said sheet and a pair of supporting arms, each of said arms being of single piece construction and pivotally secured at their respective lower ends thereof to said reinforcing rib, the pivot axis of each of said arms being perpendicular to said rib and said sheet, each of said arms defining a hook member at its upper end thereof adapted to fit about the upper edge of said automobile visor whereby said tinted sheet can be horizontally and vertically adjusted through the positioning of said hook members toward or away from each other along said upper edge of said visor and the pivoting of said supporting arms with respect to said rib and said sheet whereby the sun screen serves as an adjustable extension of the sun visor.

* * * * *